(12) United States Patent
Cortright et al.

(10) Patent No.: US 6,895,426 B1
(45) Date of Patent: May 17, 2005

(54) ADDRESSES AS OBJECTS FOR EMAIL MESSAGES

(75) Inventors: David S. Cortright, Mountain View, CA (US); Daniel W. Crevier, San Jose, CA (US); James J. O'Connor, Santa Cruz, CA (US); Michael W. Fullerton, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 618 days.

(21) Appl. No.: 09/690,426

(22) Filed: Oct. 17, 2000

(51) Int. Cl.$^7$ .............................................. G06F 15/16
(52) U.S. Cl. ...................................... 709/206; 715/764
(58) Field of Search ................................ 715/739, 751, 715/752, 764, 501, 513; 709/206, 245, 203, 310, 320, 328, 329; 707/315, 313; 345/329, 330, 752, 835, 739, 751

(56) References Cited

U.S. PATENT DOCUMENTS

| | | | | |
|---|---|---|---|---|
| 6,147,773 A | * | 11/2000 | Taylor et al. | 358/400 |
| 6,163,794 A | * | 12/2000 | Lange et al. | 709/202 |
| 6,345,288 B1 | * | 2/2002 | Reed et al. | 709/201 |
| 6,349,299 B1 | * | 2/2002 | Spencer et al. | 707/10 |
| 6,393,464 B1 | * | 5/2002 | Dieterman | 709/206 |
| 6,405,243 B1 | * | 6/2002 | Nielsen | 709/206 |
| 6,433,800 B1 | * | 8/2002 | Holtz | 345/835 |
| 2003/0069874 A1 | * | 4/2003 | Hertzog et al. | 707/1 |
| 2003/0097361 A1 | * | 5/2003 | Huang et al. | 707/10 |

OTHER PUBLICATIONS

Teri Battles: "Tips For Using Yahoo EMai"I, dated Jan. 17, 1999, p. 1–2, retreived from www.hotbot.com.*

BSC Information Technology: "Outlook For Windows 95 Address Book", dated Jan. 31, 2000, p. 1–4, retreived from www.bridgew.edu.*

* cited by examiner

Primary Examiner—Marc D. Thompson
(74) Attorney, Agent, or Firm—Lyon & Harr, LLP; Richard T. Lyon (57) ABSTRACT

The present invention is directed at a system and process for allowing a user to treat email addresses as objects. This allows easy manipulation of the email addresses, such as allowing them to be added to a contact list, copied to the computer's clipboard, or double-clicked to open the related contact information for that email address sender. Email addresses are treated as objects in the message preview pane and full message windows of both incoming and outgoing email messages. A small icon is added to the text of each address. In a preferred embodiment, the icons will vary depending on the pedigree of the address. The invention is not limited to single addresses. Rather, an entry denoting a mailing list could also be treated as an object and a unique icon could be employed to indicate the nature of the entry. For outgoing messages, the pedigree of the address or list is determined by monitoring where the user obtained the address. For incoming messages, the message header is parsed and searched to find addresses that match the receiving user's address book. If no match is found, a generic address icon is added before the text of the address, while the system checks the email header against other address sources such as server lists. Once the address is marked with an appropriate icon the user can manipulate the address in various ways allowing the user to readily edit or add email addresses to their contact list. Additionally, the invention may include contextual menus to assist the user in this manipulation.

18 Claims, 12 Drawing Sheets

| Icon | |
|---|---|
| | <text being entered> |
| | <valid email address not in local contact store> |
| | <valid email address that corresponds to a person in the local contact store> |
| | <valid email address list that corresponds to an entry in the local contact store> |
| | <valid email address that was obtained via an LDAP server or other non-local contact store> |
| | <valid newsgroup> |
| ? | <invalid or unresolved address> |

FIG. 9

| Outgoing Address Object | Possible Contextual Menu Items |
|---|---|
| Text | •Check Name against list of LDAP servers.<br>•Copy<br>•Delete |
| Address | •Add Sender to Address Book<br>•Copy Address<br>•Delete Address |
| Person | •Check Name against list of email addresses, if person has more than one.<br>•Open contact<br>•Copy Address<br>•Delete Address |
| List | •Open Group<br>•Expand Group<br>•Copy Address<br>•Delete Address |
| LDAP Address | •Check against list of email address, if person has more than one, or check against list of people with submenus that contain their email address.<br>•Check name against list of LDAP servers.<br>•Add to Contacts<br>•Copy Address<br>•Delete Address. |
| Newsgroup | •Open Newsgroup<br>•Copy<br>•Delete |
| ? Address | •Same as the menu for the original address object. |

FIG. 10

| Incoming Address Object | Possible Contextual Menu Items |
|---|---|
| Address | •Add to Contacts<br>•Copy Address<br>•Mail To |
| Person | •Add to Contacts<br>•Copy Address<br>•Mail To |

FIG. 11

ADDRESSES AS OBJECTS FOR EMAIL MESSAGES

BACKGROUND OF THE INVENTION

1. Technical Field

This invention relates to a system and process for treating electronic mail addresses in both the preview pane and full message window of an electronic mail program as objects.

2. Background Art

Mail programs currently resolve email addresses into friendly names and verify that they are—or are likely to be—valid email addresses by checking them against a local or server-based database. For example, a user enters joez554q57@hotmail.com in a mail message and the software changes it to "Joe Smith" based on a comparison against the user's entry for Joe Smith in the user's address book, a reference section listing email-addresses and individual's names in an email program. Likewise, the look up could be in a shared corporate database or one hosted by an Internet service. Although users of electronic mail systems typically have a number of email messages in their email inbox or have other sources of data in their electronic mail store that have email addresses (sent items folder or other folders), these users do not take advantage of the address book associated with their email. Data entry of the long strings of characters and numbers that make up most electronic mail addresses is time consuming and tedious. Therefore, most computer users do not take the time to enter the contact data into the address book. As a result, the mail program being utilized cannot resolve received email addresses into their friendly name and validate the associated address.

As a result of an unpopulated address book, the sender most often must type in the email address or addresses when composing the message in order to successfully send the message to the intended recipient or recipients. Depending on the number of intended recipients and the length of their email addresses this could require many keystrokes and mouse clicks and become a very time-consuming and cumbersome process. Additionally, it is easy for the sender to inadvertently enter a wrong character resulting in an incorrect email address and thus preventing the email from reaching its intended destination when the email is sent. Many times this error will not be obvious at the time the sender sends the email and as a result a significant time could pass before the sender realizes his error. Since one of the primary advantages of email is its speed of transferring information this delay is a significant drawback.

SUMMARY

The email addressing system and method according to the present invention resolves the foregoing problems. The present invention is directed at a system and process for allowing a user to treat both incoming and outgoing email addresses in the message preview pane as well as the full message window of an email message program as objects or distinct entries. This preview pane displays items in a separate pane so that the user can view the list of emails and the open email item at the same time. The full message window displays the whole email in a window when selected from an email message list by double clicking on the entry. This allows easy manipulation of the email addresses, such as allowing them to be added to a contact list, copied to the computer's clipboard, or double-clicked to open the related contact information for that email address' sender. Hence, this system and method of addressing email messages minimizes the number of operator actions required in order to address email messages by facilitating the user in completing his or her contact database or address book. As a result, it takes much less time and is easier to use than other email addressing systems. Furthermore, the present invention prevents data entry errors which might preclude sent email from reaching its desired destination. The email addressing system and method according to the present invention also provides the user with graphical information as to the source address contained in either outgoing or incoming email messages. This feature provides additional user-friendly information that has not been displayed in previous email management systems.

Generally, in the present invention email addresses in the preview pane as well as the full message window of an email message program are treated as objects in both incoming and outgoing email messages. A small icon is added to the text of each email address, preferably just before the text. These icons are displayed in the short headers or preview panes of the email program.

In a preferred embodiment, the icons will vary depending on the pedigree of the address. For example, one type of icon indicates that the address came from (in the case of outgoing messages) or is contained in (in the case of incoming messages) the user's address book. Other icons are used to indicate the address was manually entered, came from a "most recently used" address list, or came from a Lightweight Directory Access Protocol (LOAP) server, or other type of server. The invention is also not limited to single addresses. Rather, an entry denoting a mailing list could also be treated as an object and a unique icon could be employed to indicate the nature of the entry.

For outgoing messages, the pedigree of the address or list is determined by monitoring where the user obtained the address (e.g., from their address book, LDAP server, they manually entered it, etc.). For incoming messages, the message header in the preview pane or the full message window of the email message program will be parsed and searched to find addresses that match the receiving user's address book. If no match is found, a generic address icon will be added before the text of the address, while the email addressing system checks the email header against other address sources such as server lists, for example.

In cases where the header contains large recipient lists, the above described search process could be time- and processor-intensive. Thus in a preferred embodiment, only the address found in the "From" portion of the header will be compared to the user's address book immediately. All other addresses (e.g., as found in the other address fields such as To, cc, bcc) will be marked with an intermediate icon of some type and the comparison will be conducted either in the background when possible (e.g., when the user is viewing the message) or immediately if the user attempts to select one of these addresses in the recipient list.

Once the email address is marked with an appropriate icon the user can manipulate the address in various ways. A single click on this icon will select the entire text of the address and allow it to be dragged as an object to other locations in the email header or copied to a place outside the header (e.g. the subject field, body of the message, etc.). Double clicking on the icon will open the item associated with the address after looking up the contact in the contact store (e.g. address book), or prompt the user to create an associated item in the local contact store if the address was manually entered or captured from a LDAP server. In this way a user can readily edit or add email addresses to his or her contacts list, thereby facilitating its inclusion in future outgoing email transmissions.

Additionally, the invention may include contextual menus or context-sensitive menus, which allow the user to manipulate the icons or addresses in various ways, such as copying it, deleting it or adding the address to the user's address book or other contact list. In regard to the contextual menu item for adding the address to the user's address book, the actual item reads "Add Sender to Address Book". Primarily, selecting this item adds the sender to the user's address book. However, an additional convenient feature associated with this item is that the user has the option to open a window containing editable content associated with the sender if the sender is already in the address book.

DESCRIPTION OF THE DRAWINGS

The specific features, aspects, and advantages of the present invention will become better understood with regard to the following description, appended claims and accompanying drawings where:

DETAILED DESCRIPTION OF THE PREFERRED EMBODIMENTS

In the following description of the preferred embodiments of the present invention, reference is made to the accompanying drawings, which form a part hereof, and which are shown by way of illustration of specific embodiments in which the invention may be practiced. It is understood that other embodiments may be utilized and structural changes may be made without departing from the present scope of the invention.

Figure 1:
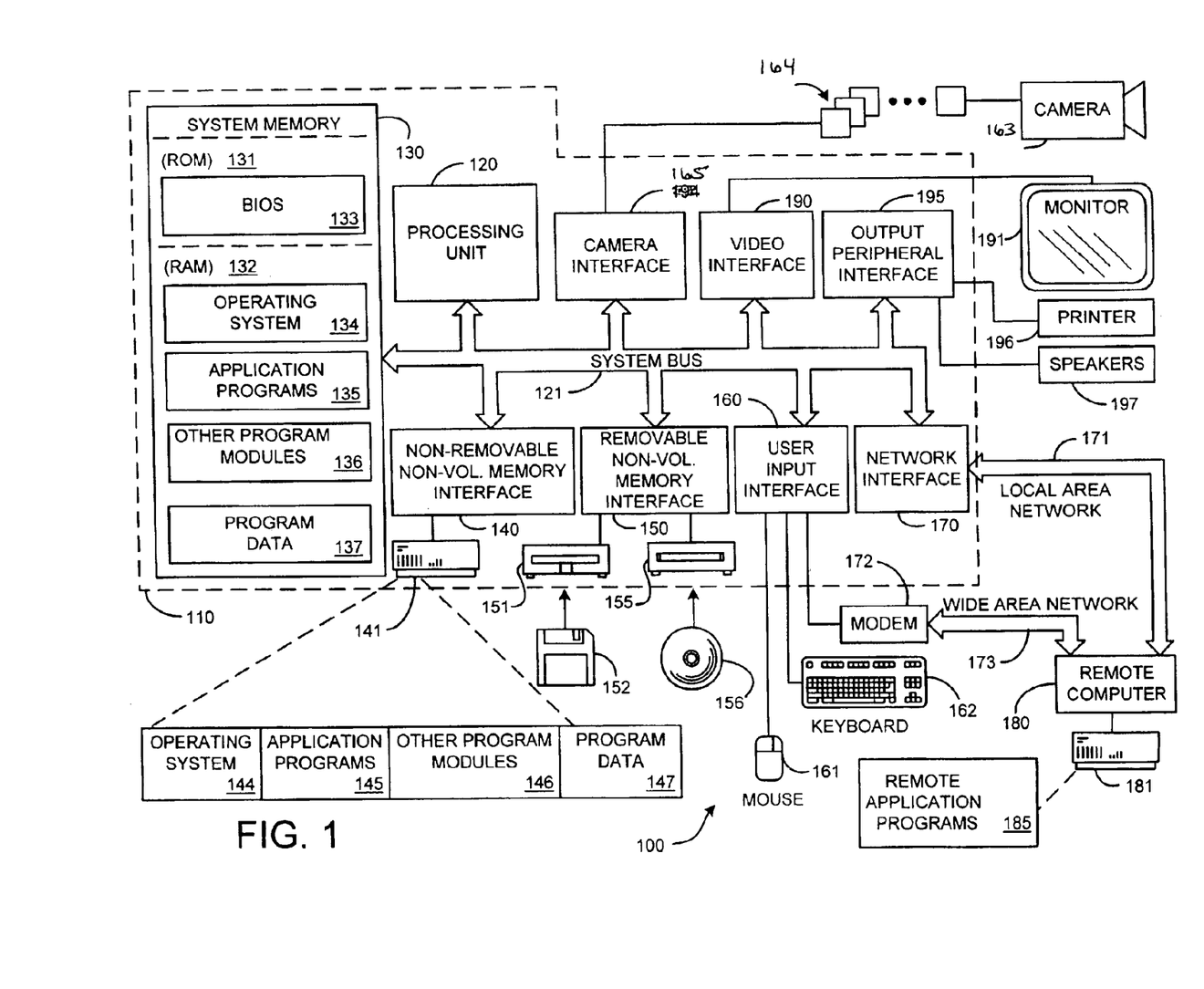
FIG. 1 is a diagram depicting a general purpose computing device constituting an exemplary system for implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable is media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the system and process embodying the present invention. More specifically, the present invention is directed at a system and process for allowing a user to treat both incoming and outgoing email addresses found in the preview pane of an email message or in the full text window of the email message in an email program as an object. This preview pane displays items in a separate pane so that the user can view the list of emails and the open email item at the same time. The full message window displays the whole email in a window when selected from an email message list by double clicking on the entry. This allows easy manipulation of the email addresses, such as allowing them to be added to a contact list. An icon is added to the text of the email address, preferably just before the text. These icons are preferably displayed in the short headers or preview panes of the email program.

Figure 2:
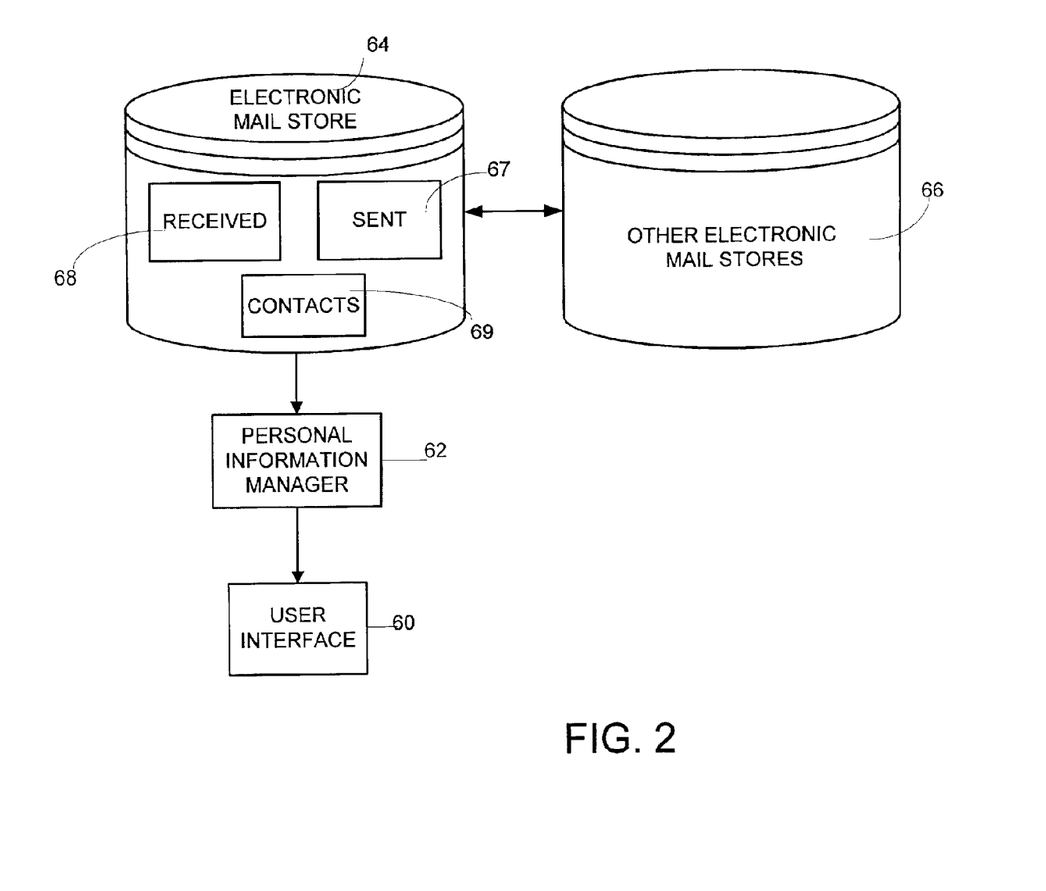
FIG. 2 is a general block diagram illustrating an overview of the present invention.
Figure 3:
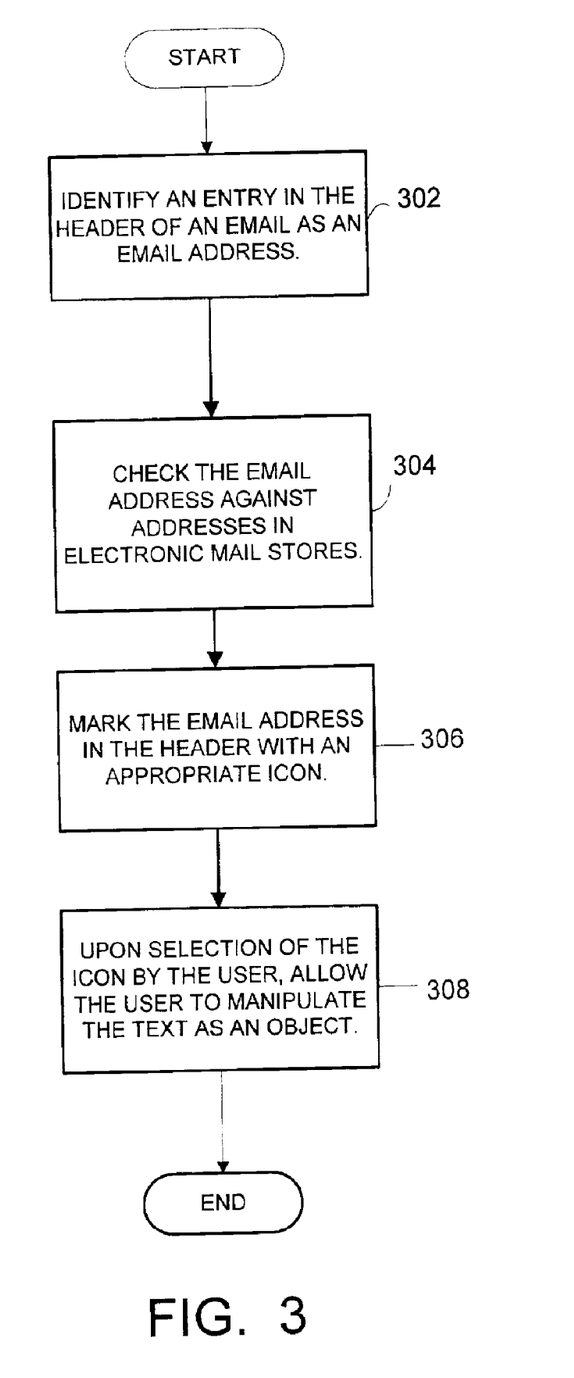
FIG. 3 is an overview flowchart of the general operational features of the present invention.

In general, as shown in FIGS. 2 and 3, the user interfaces via user interface 60 to a Personal Information Manager 62 to access the electronic mail stores resident in a personal computer 64 or on a server 66. These electronic mail stores 64, 66 can include email messages sent 67, email messages received 68 and contacts 69 in a contact database, address book or contacts compiled in another format. In operation, the system identifies an entry in the preview pane or header of an email message as an email address or similar text (step 302). The system then checks this text against a contact list or lists in its electronic mail stores such as the user's contact database or address book, or compares it to the contact lists in a server or multiple servers as shown in step 304. The system then associates the email address with an appropriate icon depending on the source of the email address (step 306). Upon selection of this icon by the user, the user can move or copy the text of the email address to another location, delete it, open the address to read its contents or manipulate the text as an icon in other ways indicated by step 308.

The icons of the present invention vary depending on the source of the email address. For example, one type of icon indicates that the address came from or is contained in the user's address book. Other icons are used to indicate the address was manually entered by the user, or came from a server, for Instance. An entry denoting a mailing list could also be treated as an object and a unique icon could be employed to indicate the nature of this entry. As shown in Table 1 in FIG. 9, different icons are used to indicate the sources of different addresses. Furthermore, depending on the source and status of the email address parsed from the message header, different actions are taken by the system. The process by which this generally occurs for an incoming message is shown in FIGS. 4A and 4B.

Figure 4A:
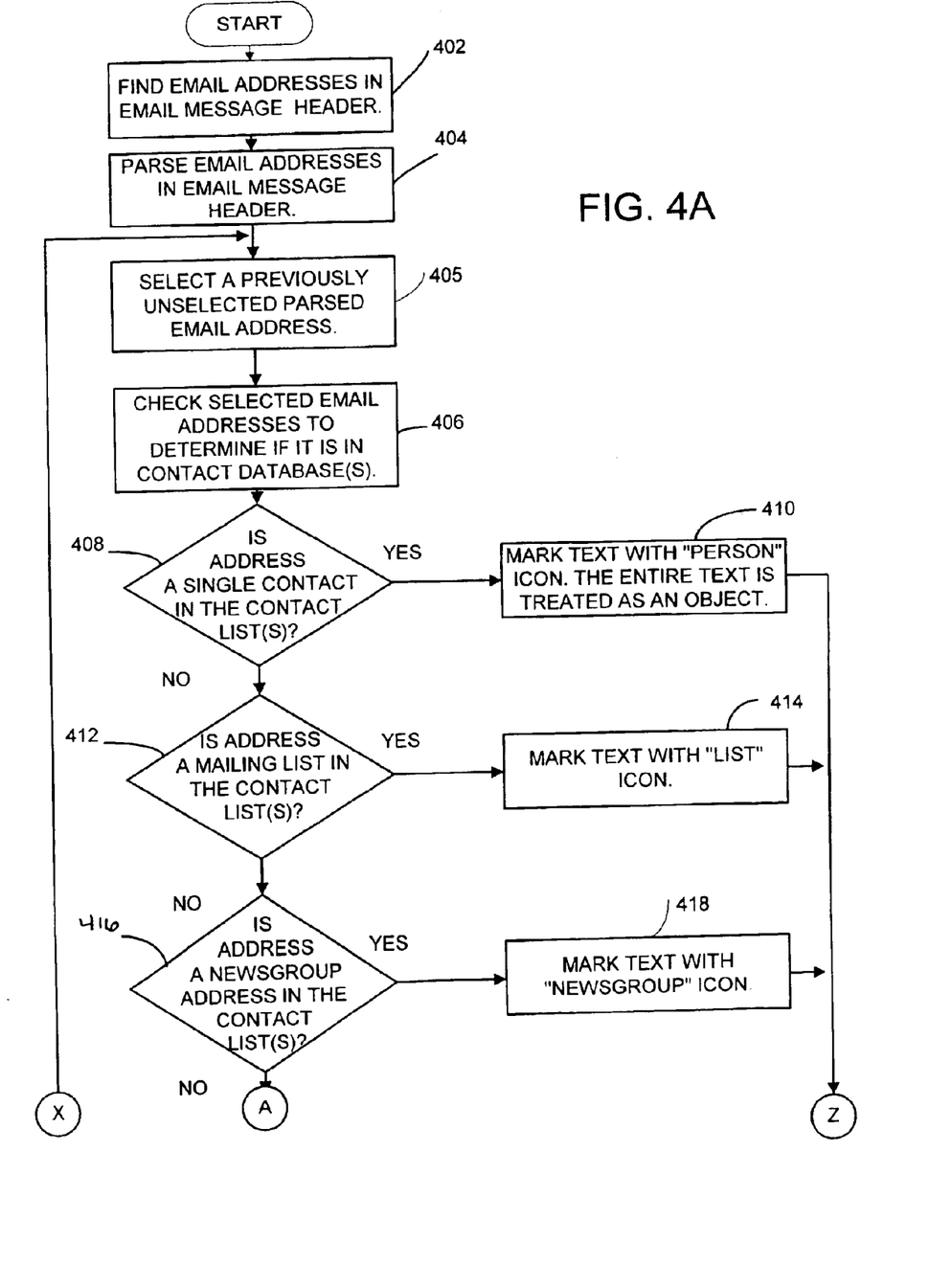
FIG. 4A is a flowchart of the general operations of the present operation when manipulating an incoming email message.
Figure 4B:
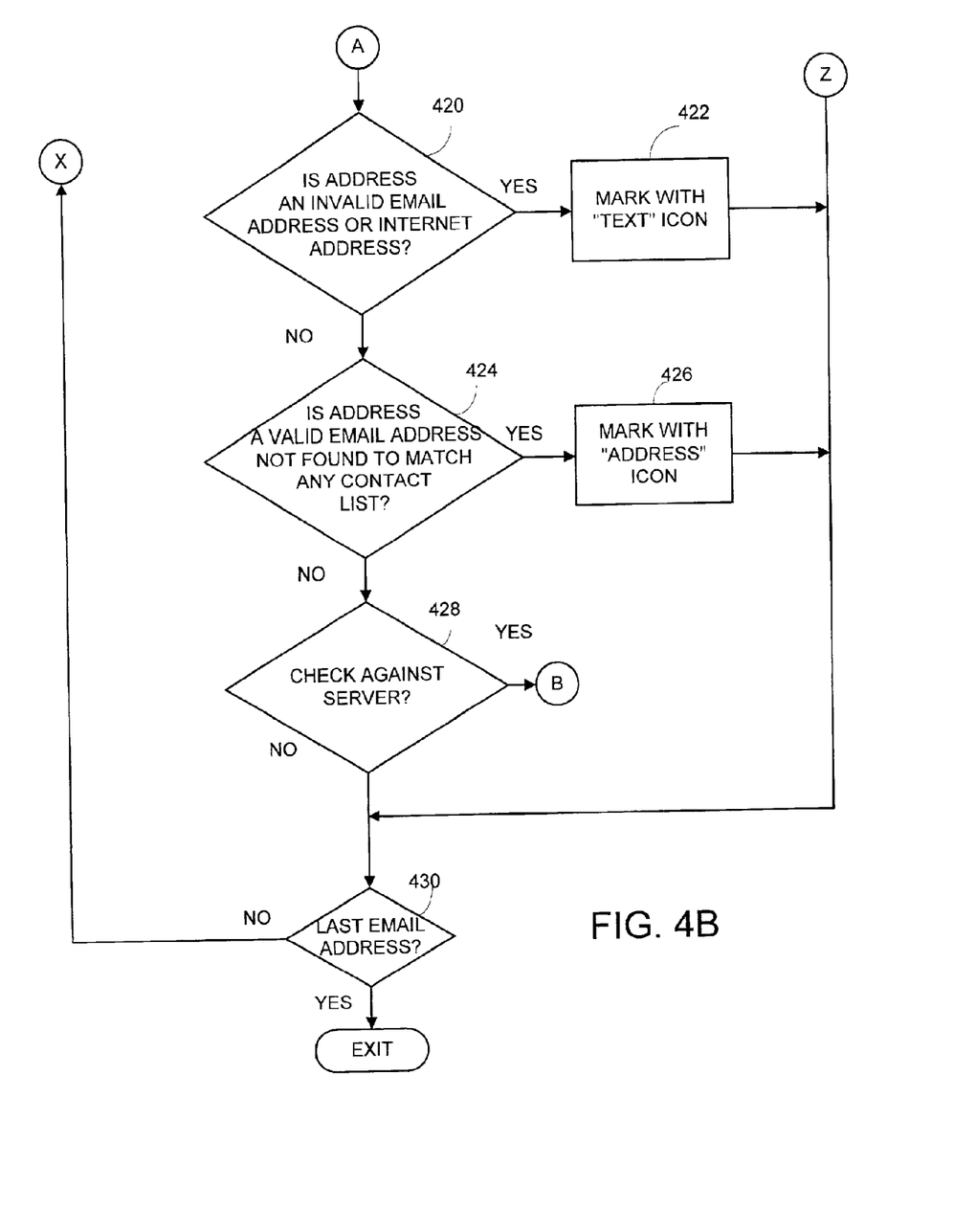
FIG. 4B is a continuation of the flowchart shown in FIG. 4A.

As shown in FIGS. 4A and 4B, the system parses the incoming email message's header address fields from the preview pane or the full text window of the email message (e.g., To, From, cc, bcc lines) into a text format and identifies potential email addresses. The system does this by finding the address fields (step 402) and then parsing these fields using the delimiters (e.g., semi-colons) between addresses in the field (step 404). The system selects a previously unselected parsed email address as shown in step 405. The system then checks the selected email addresses against a contact database, or databases, such as an electronic address book or address books as shown in step 406. If the address parsed from the email header in the preview pane or full text window of the email message is found as a single contact in the contact list (step 408) the text is marked with a "person" icon as shown in step 410. The entire text is then treated as an object and can no longer be edited. If the parsed email address is not found as a single contact in the contact database, the system then checks if this address corresponds to a mailing list as shown in step 412. If the email address is found to be a mailing list in the contact database it is marked with a "list" icon (step 414). If the parsed email address is not a mailing list, the system then continues to search its electronic stores to determine if the address matches a valid newsgroup address as shown in step 416. If so, as shown in step 418, the address text is associated with a "newsgroup" icon. If it is not a newsgroup address, the system then determines if the parsed address text is not a valid email address or is an Internet address (step 420). In one embodiment, the system uses an algorithm based on the rules outlined in RFC 822 and RFC 1034 for valid mailbox constructions and valid domain name constructions respectively. In this case, the text is marked with a "text" icon (step 422) and is still editable. However, if the address is a valid email address but not found in any of the aforementioned checks (step 424), the address is marked with an "address" icon (step 426). The text remains editable in this case too.

Figure 4C:
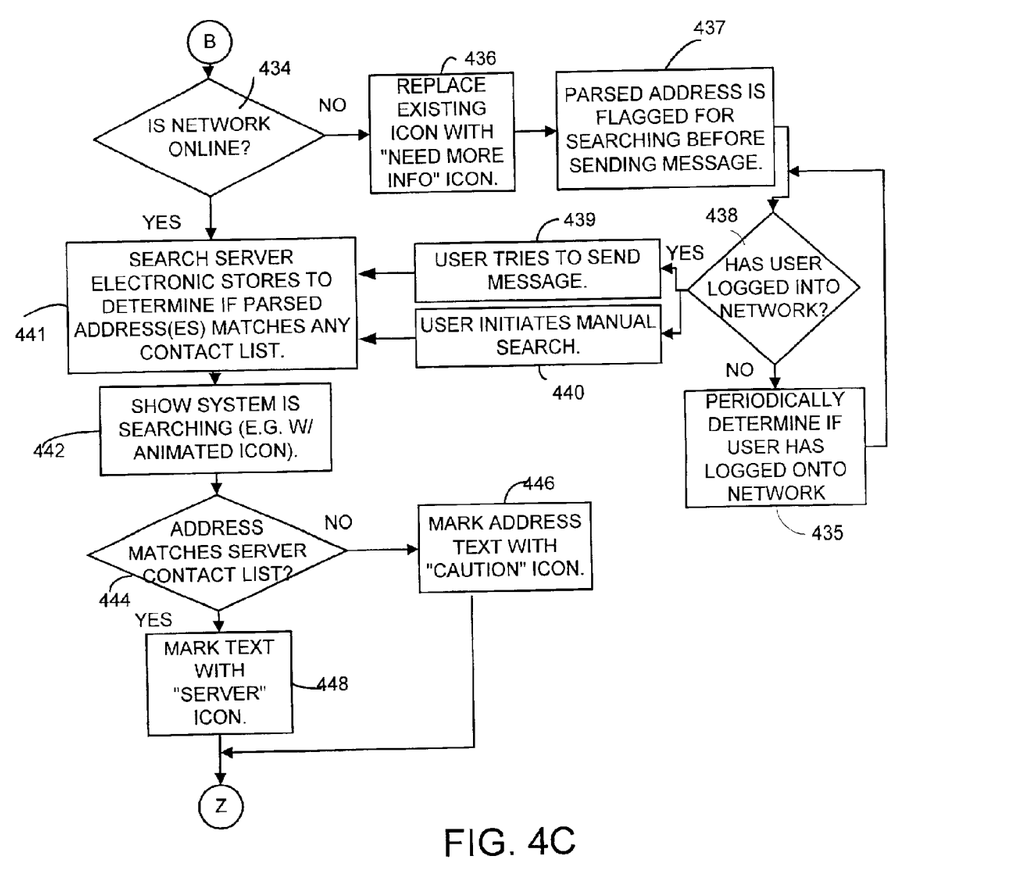
FIG. 4C is a flowchart showing the general operations of the present invention when checking an email address against a server database.

As shown in FIG. 4B, the system may also optionally check an email address that has been marked with the "address" icon against one or more server databases (step 428) to see if the address matches a contact entry in the server's or servers' electronic stores. If the parsed address is found then the "address" icon is changed to a "server" icon. More specifically, as shown in FIG. 4C, the system determines if there is currently a network connection (step 434). If there is no network connection, then the system changes the "address" icon to a "need-more-information" icon (step 436) and flags the message (step 437) to schedule a later search once the user logs into the network (step 438). The aforementioned search will be conducted if it is either initiated manually by the user (step 440) or the user tries to send the message (step 439). In the latter case (step 439) the flagged message will be checked automatically before sending the message as shown in steps 438, 439 and 440. If, however, it is determined in step 434 that there is a network connection, the system will initiate a search immediately (step 441). Regardless of how the server search is initiated, it entails first checking a default servers electronic stores for the parsed email address. Preferably the address icon is animated during the search to show the network activity (step 442). If no match can be found on the default server, the system check can perform the above checks on other available servers in sequence. If no match can be found on any server contact list (step 444), then the address is marked with a "caution" icon as shown in step 446. If a unique match is found on the server, the text is marked with a "server" icon (see step 448).

Finally, the system checks if the currently selected email address is the last (step 430), and if it is not the last, repeats the aforementioned process.

Figure 4D:
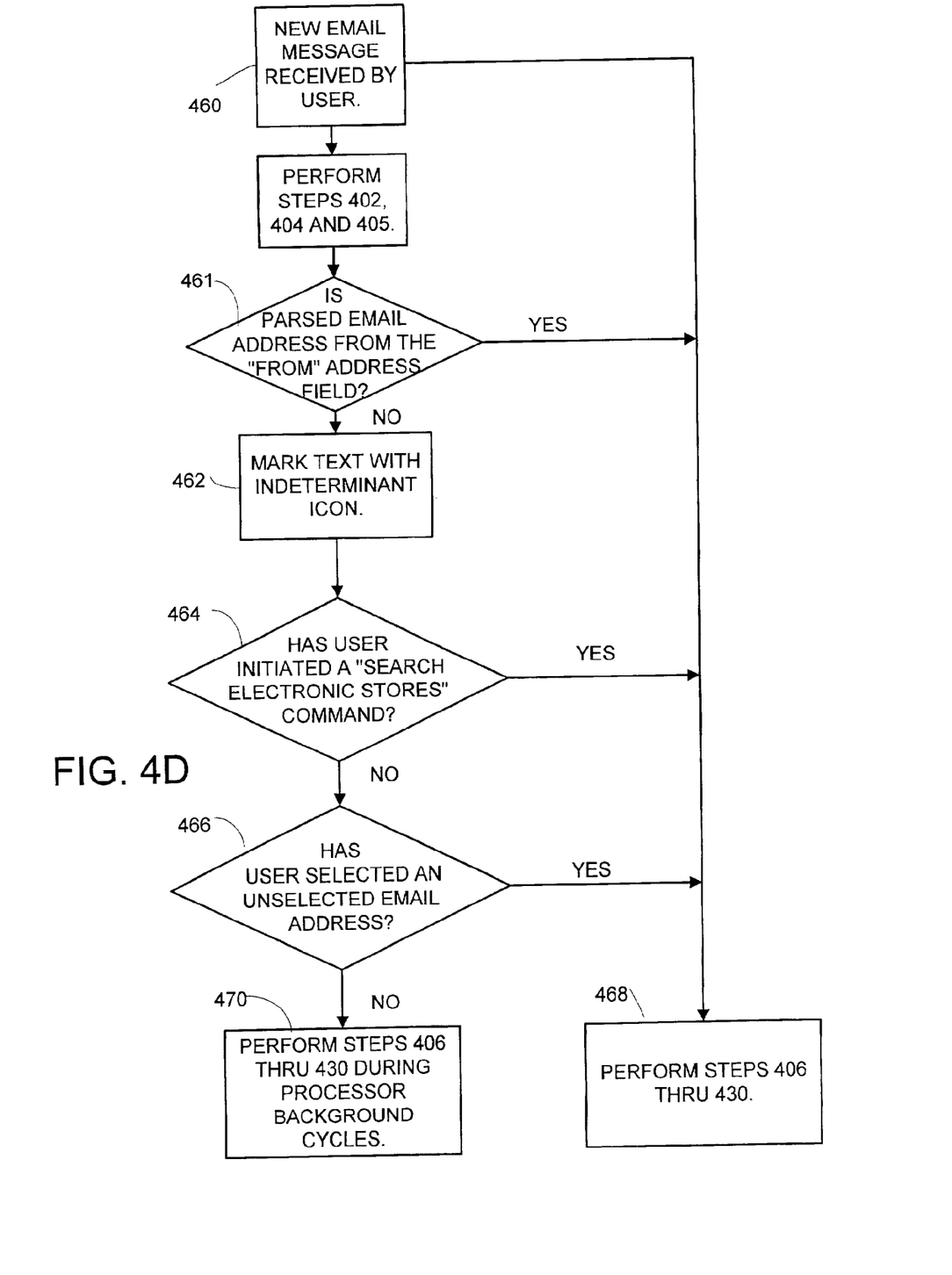
FIG. 4D is a flowchart showing an embodiment of the invention wherein only the email addresses in the "From" line are parsed and compared to the electronic mail stores.

For large recipient lists, the lookup work associated with the aforementioned process of finding the received address in one of various sources can be time-consuming and processor intensive. Therefore, in a preferred embodiment shown in FIG. 4D when a new email message is received (step 460) the system only looks up the address in the "From" line of the preview pane or full text window of the email message immediately after downloading (step 461). All other addresses will initially be assigned an indeterminate icon, such as the text icon, or a grayed out question mark (step 462). If the user initiates a "search electronic stores" command (step 464) or selects an unsearched email (step 466), the system will then proceed to immediately look up the address or addresses and append the appropriate icon as shown in step 468. Basically the system does this by performing steps 406 to 430 of FIGS. 4A and 4B (and optionally the steps shown in FIG. 4C). If the search command is chosen, all the unsearched addresses are checked, whereas if one or more addresses are individually selected, only those addresses are checked. If the user does not initiate a "search electronic stores" command or select an address for immediate processing, the system will process the unsearched addresses in available processor background cycles. For example, when the email message is opened or previewed and is the front most window displayed on the computer screen, the system can use the processor background cycles (step 470) to sequentially look up the recipients and set the appropriate icon by the methods discussed in the previous paragraphs and depicted in FIGS. 4A and 4B (and optionally FIG. 4C).

Figure 5A:
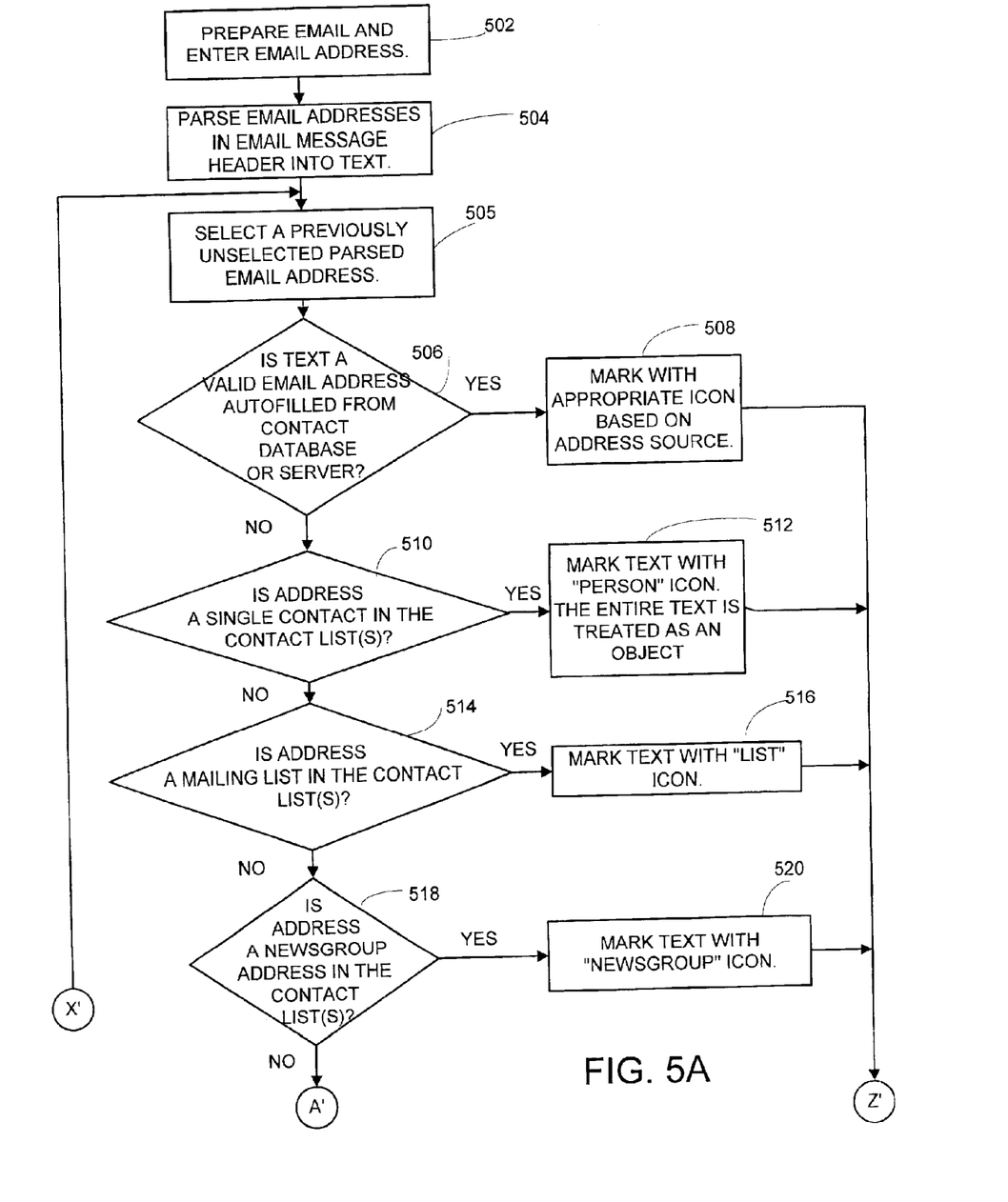
FIG. 5A is a flowchart showing the general operations of the present invention when manipulating an outgoing message.
Figure 5B:
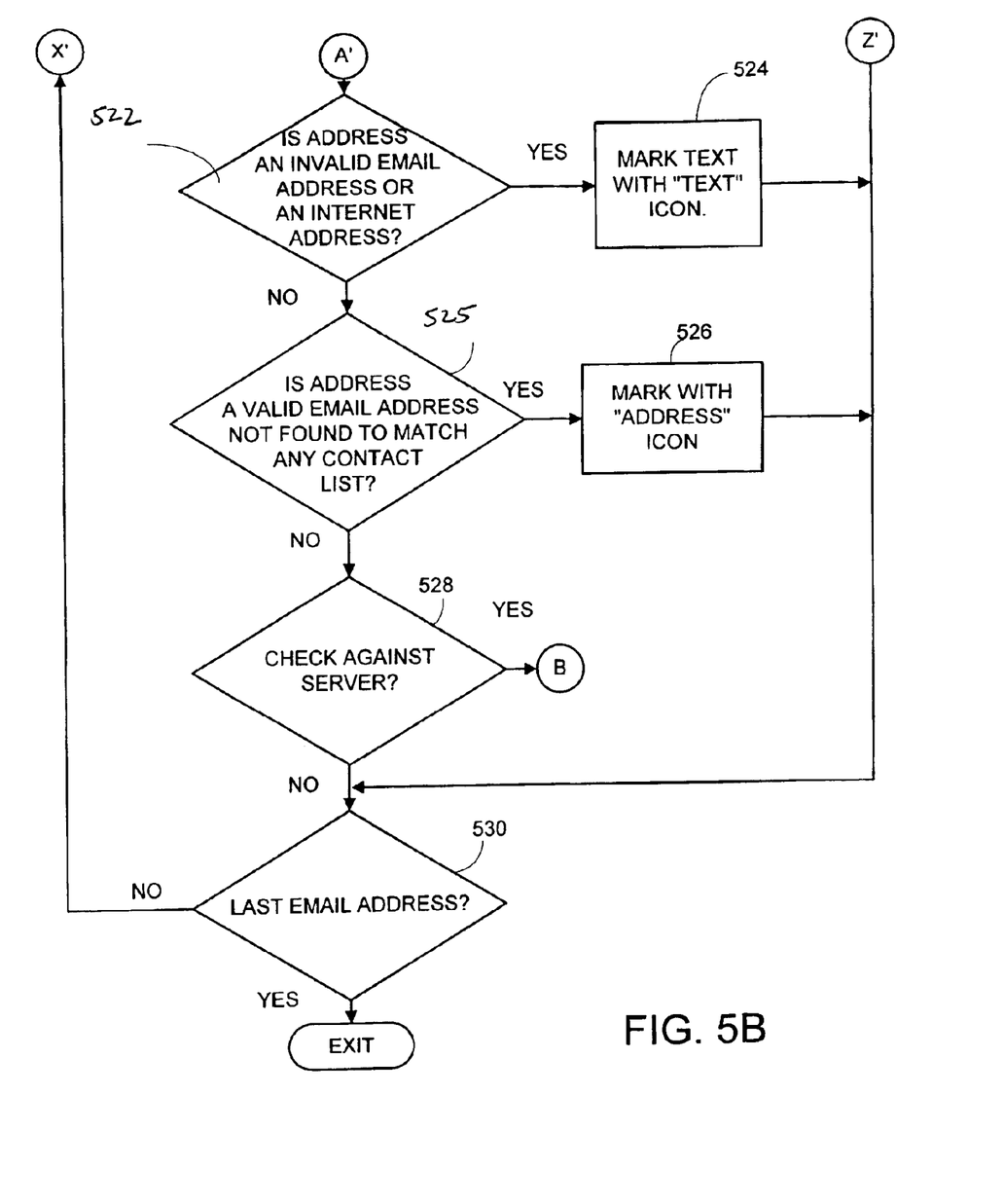
FIG. 5B is a continuation of the flowchart shown in FIG. 5A.

The system processes outgoing email messages in a similar manner as discussed above as shown in FIGS. 5A and 5B. The user prepares an email and enters an email address or addresses as shown in step 502. In step 504, the system then parses the email address or addresses from the header address fields of the preview pane or full text version of the email message into a text format using the address field delimiters. In step 505 the system selects a previously unselected parsed email address for processing. The system then checks to determine if the address text is a valid email address that was autofilled from a contact database resident on the user's computer or server (step 506). If this is the case, the system then marks the parsed address with an appropriate icon based on the source of the address as shown in step 508. For example, if the address was autofilled from the contact list, the system would mark the address with a "person", "list" or "newsgroup" icon as appropriate. If the address was not autofilled from the user's computer, or a server, and was entered manually, the system begins to check the electronic stores to see if it can find a match to the address text. The system first checks its contact database or address book to see if the parsed address matches a single address in its contact database (step 510). If the parsed address is found to match a single contact in the contact database, then the text is associated with a "person" icon, as shown in step 512. If the address is not a single contact in the contact database, the parsed address is then checked to see if the address corresponds to a mailing list in the contact database (step 514). If so, the address is associated with a "list" icon (step 516). If the address is neither a single contact, nor a mailing list in the contact database then it is checked to see if it matches a newsgroup address (step 518). As shown in step 520, if a match is found then the parsed address is associated with a "newsgroup" icon. If the system determines that the address is an invalid email address or is in fact an Internet address (step 522), the text is marked with a "text" icon (step 524) and is still available for editing by the user. If it is found that the address is a valid email address but found not to match any contact list (step 525), the address is marked with an "address" icon as shown in step 526. The address may then optionally be checked against any server contact lists (step 528) (in the manner described in connection with FIG. 4C). The system repeats the process until all email addresses have been checked (step 530).

Figure 9:
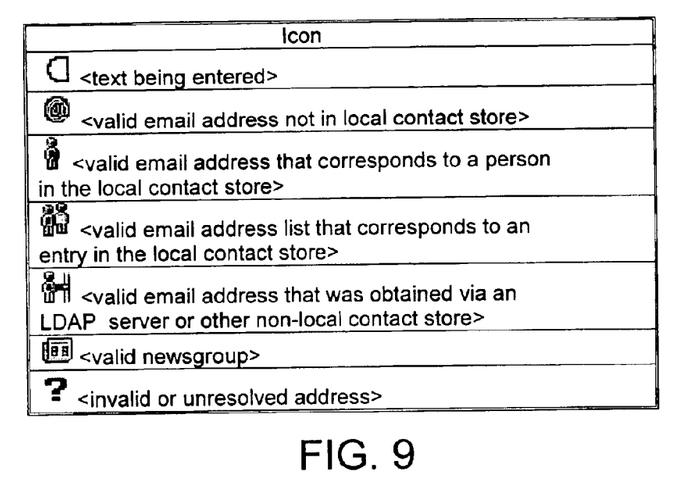
FIG. 9 shows Table 1 which depicts different icons used to indicate the sources of different addresses.

If the email management system being used with the present invention has the capability to check the history of previously sent to email addresses to determine whether there have been problems sending to an address in the past, then the icon associated with a particular email source could additionally be marked with a "problem" or "success" indicator. An example of a "person" icon modified in this way is shown in Table 1.

Figure 6:
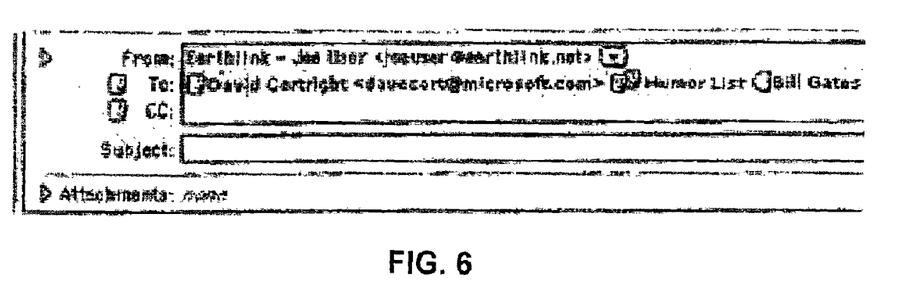
FIG. 6 is a sample user interface of a working example of the present invention showing the message header of an outgoing message displayed in an open outgoing message window.
Figure 7:
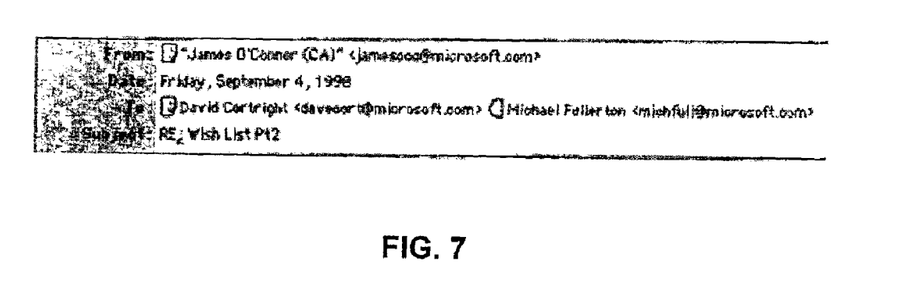
FIG. 7 is a sample user interface of a working example of the present invention showing the message headers of an incoming message displayed in the preview pane.
Figure 8:
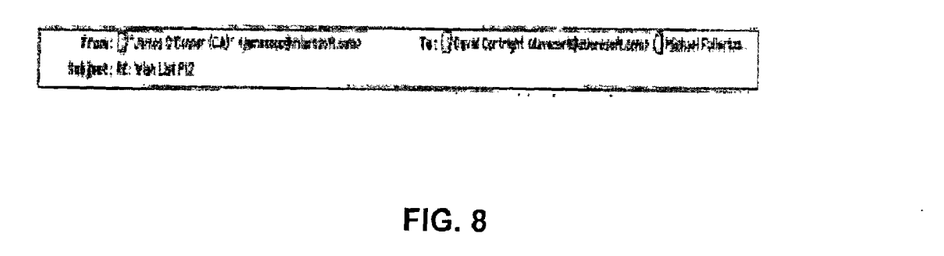
FIG. 8 is a sample user interface of a working example of the present invention showing the message headers in an open incoming message window.

Icons will be displayed in the short headers and preview pane views. An example of the icons displayed in an outgoing message window is shown in FIG. 6. An example of icons displayed in an incoming message preview pane is shown in FIG. 7. An example of icons displayed in the message headers of an open incoming message are shown in FIG. 8.

The previous discussion has addressed the particulars of processing incoming and outgoing messages. The following paragraphs apply to general features of the present invention and are not specific to the processing of incoming or outgoing email.

For addresses that correspond to contacts in the contact list or address book, the text and icon are treated as a single object. Thus the user is not able to edit the name or email address, but he or she is able to move it, delete it, or double click on it to open the contact as will be explained later. Underlining of the text can be used to visually indicate to the user the fact that the text is an object. For addresses that do not correspond to known contacts, the aforementioned "address" icon (if a valid email address) or "text" icon (if not a valid email address) will be displayed and the text of the address can be processed as plain text with full editing capabilities. This allows the user to modify the address as necessary. The system may strip out commas or other delimiters in the email address headers and rely on icons as address separators instead.

When the system is processing addresses, if an address is not unique or there is more than one address for a contact, the address may be marked with a "need more info" icon. The user may then be prompted to choose which person or address is correct and the address text is marked with an appropriate icon.

A single click on one of the object icons of the present invention will select the entire text of the object. In addition, multiple objects can be selected via conventional cmd-click (discontiguous) or shift-click/shift-arrow (contiguous) procedures. A click and drag operation can be used to move the object within the email headers (e.g., between any of the To, From, cc, or bcc fields). The object can also be copied (by selecting the object and employing a copy command) for placement outside the address fields (e.g., the subject field, newsgroups field, the body of the message, or the Desktop). Double clicking on the icon will open the item associated with the address after looking up the contact in the local contact store (e.g. address book), or prompt the user to create an associated item if the address was manually entered or captured from a LDAP server. In this way a user can readily edit or add email addresses to his or her contacts list, thereby facilitating its inclusion in future outgoing email transmissions.

Figure 10:
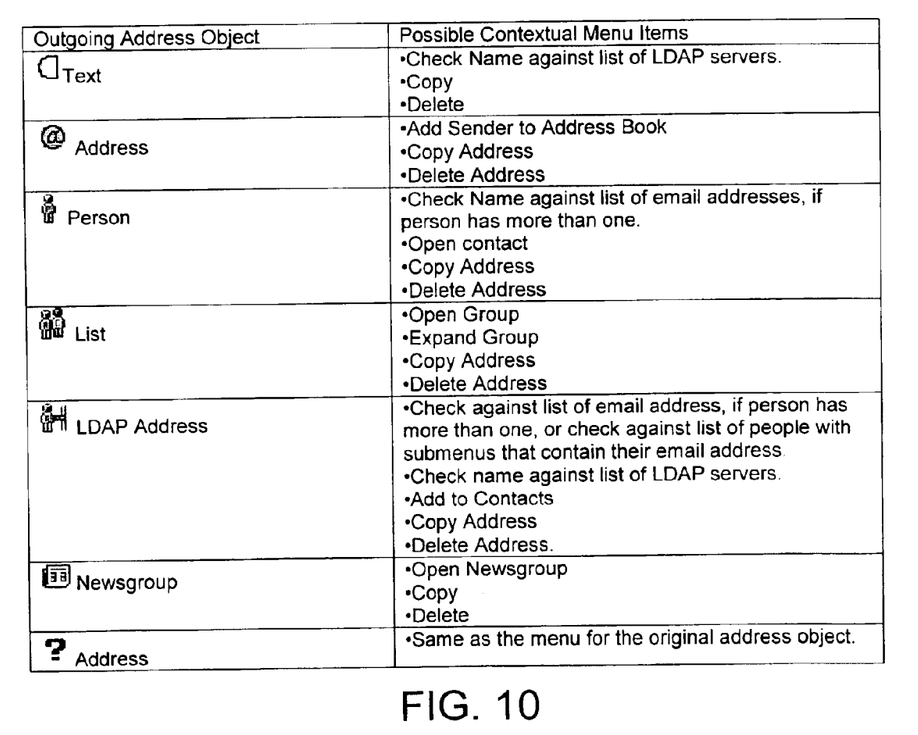
FIG. 10 shows Table 2 which defines possible contextual menus for outgoing address objects.

Once an object has been selected, it is preferred that the user have access to a display of the appropriate contextual, or context-sensitive menu. Such a context-sensitive menu highlights options that are available depending on the context in which the option is called. Depending on the type of address object, various contextual menus are possible. For outgoing address objects, Table 2 in FIG. 10 defines possible contextual menus.

Figure 11:
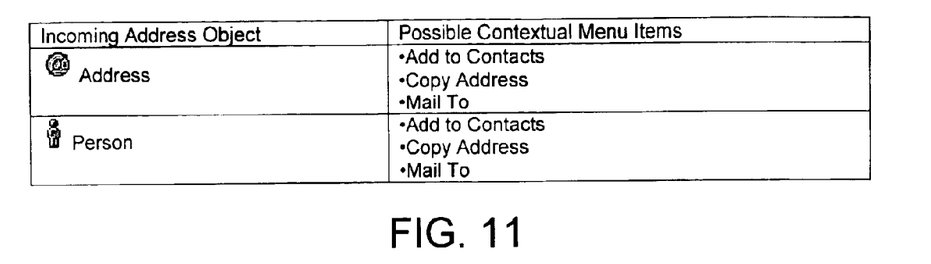
FIG. 11 shows Table 3 which defines possible contextual menus for incoming address objects.

For incoming address objects, the contextual menus shown in Table 3 in FIG. 11 are possible:

The contact item in the user's address book can also be made to be conveniently opened by a simple double click on an associated person, list, or newsgroup icon (rather than using the above-described menus). Or, if the address has an address or server icon, a double click can be made to activate a prompt to invite the user to create a new contact in the address book associated with the address. This latter feature allows a user to conveniently add contacts to his or her contact list. In regard to the contextual menu item for adding the address to the user's address book, the actual item reads "Add Sender to Address Book". Primarily, selecting this item adds the sender to the user's address book. However, an additional convenient feature associated with this item is that the user has the option to open a window containing editable content associated with the sender if the sender is already in the address book.

While the invention has been described in detail by specific reference to preferred embodiments thereof, it is understood that variations and modifications thereof may be made without departing from the true spirit and scope of the invention. For example, indicators other than icons (e.g. attributes of the text itself such as typeface, bold, italic, underline, etc.) could be employed to identify addresses to indicate the address source and status. Also, although the previous description describes processing on incoming and outgoing email messages, the same processing could be performed on stored electronic data. For example, similar processing as described in the foregoing paragraphs could be used to take address data from the email inbox (or other electronic file containing email messages) to populate an address book.

Wherefore, having thus described the present invention, what is claimed is:

1. A computer-implemented process for allowing a user to manipulate an email address contained in the preview pane or full message window of an email message of an email program as an object, comprising using a computer to perform the following acts:
   identifying an entry in the preview pane or full message window of an email message as an email address, said identifying comprising,
      finding at least one field in the preview pane or full message window containing an email message header of the email message containing one or more email addresses, and
      parsing at least one email address from the at least one field in the preview pane or full message window which contains one or more email addresses;
   checking the email address against addresses in one or more contact databases to determine if it is contained in a contact database, wherein a contact database is a set of stored contacts and corresponding addresses, and wherein said checking comprises at least one of,
      determining if the address corresponds to a single contact in the contact list,
      determining if the address corresponds to a mailing list in the contact list,
      determining if the address corresponds to a newsgroup address in the contact list,
      determining if the address corresponds to an invalid email address or internet address,
      determining if the address corresponds to a valid email address not found to match any addresses in the contact list, and if so,
         ascertaining whether the user's computer is in correspondence with one or more servers,
         if the user's computer is not in correspondence with said one or more servers,
            appending an icon indicating to the user that more information is needed before sending the email message,
            flagging the address such that an act of determining if the address corresponds to an address in the contact list of said one or more servers must be performed prior to sending an email message,
            prompting the user to establish correspondence with said one or more servers, and
            upon establishing correspondence with said one or more servers, determining if the address corresponds to an address in a contact list of at least one server;
   marking the email address with an adjacently placed indicator; and
   upon selection of the indicator by the user, allowing the user to manipulate the email address as an object.

2. The computer-implemented process of claim 1 wherein the act of marking comprises at least one of:
   appending a single recipient icon to the address if the address matches an address in the contact list;
   appending a mailing list icon to the address if the address matches a mailing list address in the contact list;
   appending a newsgroup icon to the address if the address matches a newsgroup address in the contact list;
   appending a text icon to the address if the address is an invalid email address or an Internet address; and
   appending an address icon to the address if the address is determined to be a valid email address but not in the contact list.

3. The computer-implemented process of claim 2 wherein the act of identifying an entry in the preview pane or full message window of an email message as an email address in an incoming email message comprises initially appending an icon representing an indeterminate indicator to all email addresses in the header that are not in a "From" address field, and where the acts of checking and marking these email addresses is postponed until background processing can be used to perform the checking and marking unless a user initiates a search command directing that one or more of these addresses be subjected to checking and marking immediately.

4. The computer-implemented process of claim 3 wherein the indeterminate icon appended to addresses in the email header that are not in the From address field is replaced with an appropriate icon when the checking and marking acts are performed.

5. The computer-implemented process of claim 1, wherein the act of marking comprises appending a server icon to the address if the address matches an entry in the contact list of said one or more servers.

6. The computer-implemented process of claim 1, wherein the act of marking comprises appending a caution icon to the address if the address does not match any entry in the contact list of said one or more servers, said caution icon indicating to the user that the address is not found in any contact list accessible by the user.

7. The computer-implemented process of claim 1 wherein the email message is an outgoing email message prepared by a user, and wherein the act of identifying comprises determining if the email address was autofilled from a contact database or server database.

8. The computer-implemented process of claim 7 wherein the act of marking comprises marking the autofilled email address with an appropriate indicator based on the source used to autofill the email address.

9. The computer-implemented process of claim 8 wherein the act of marking the autofilled email address with the appropriate indicator comprises the acts of:
   appending a single recipient icon to the address if the address matches an address in the contact list;
   appending a mailing list icon to the address if the address matches a mailing list address in the contact list;
   appending a newsgroup icon to the address if the address matches a newsgroup address in the contact list; and
   appending a server icon to the address if the address was autofilled from a contact list of a server.

10. The computer-implemented process of claim 1 wherein the act of manipulating comprises one of moving, deleting, or copying the object.

11. The computer-implemented process of claim 10 wherein the act of selecting an indicator comprises an act of selecting the indicator via an activation action associated with an input device.

12. The computer-implemented process of claim 1 further comprising the act of allowing a user to open an entry in the contact database associated with the address via an activation action associated with an input device.

13. The computer-implemented process of claim 1 further comprising the act of prompting a user to create an entry associated with the address in the contact database via an activation action associated with an input device whenever such an entry does not already exist in the contact database.

14. The computer-implemented process of claim 1 wherein the act of selecting an indicator further comprises an act of displaying an appropriate contextual menu depending on the type of indicator associated with said address.

15. The computer-implemented process of claim 14 wherein the act of displaying an appropriate contextual menu further comprises adding an email address to a user's contact list and wherein an email address is added to the user's contact data base upon selection of the menu item.

16. The computer-implemented process of claim 15 wherein the user has an option to open a window containing editable content associated with an email address if a contact who sent the email message is in the users contact data base.

17. The computer-implemented process of claim 1 further comprising the act of using a computer to open an item associated with the email address after looking up the item in one or more contact databases when the user double clicks on the adjacently placed indicator.

18. The computer-implemented process of claim 17 further comprising the prompting the user to create an item associated with said indicator if the address was manually entered or captured from a server.

\* \* \* \* \*